United States Patent
Iancu et al.

(10) Patent No.: US 10,940,611 B2
(45) Date of Patent: Mar. 9, 2021

(54) INCIDENT RADIATION INDUCED SUBSURFACE DAMAGE FOR CONTROLLED CRACK PROPAGATION IN MATERIAL CLEAVAGE

(71) Applicant: Halo Industries, Inc., Menlo Park, CA (US)

(72) Inventors: Andrei Teodor Iancu, Menlo Park, CA (US); Charles William Rudy, San Jose, CA (US)

(73) Assignee: HALO INDUSTRIES, INC., Menlo Park, CA (US)

( * ) Notice: Subject to any disclaimer, the term of this patent is extended or adjusted under 35 U.S.C. 154(b) by 14 days.

(21) Appl. No.: 16/550,779

(22) Filed: Aug. 26, 2019

(65) Prior Publication Data

US 2021/0023741 A1 Jan. 28, 2021

Related U.S. Application Data

(63) Continuation of application No. 16/523,880, filed on Jul. 26, 2019, now abandoned.

(60) Provisional application No. 62/703,642, filed on Jul. 26, 2018.

(51) Int. Cl.
  *B28D 5/00* (2006.01)
  *B23K 26/53* (2014.01)

(52) U.S. Cl.
  CPC ............ *B28D 5/0011* (2013.01); *B23K 26/53* (2015.10); *B28D 5/0064* (2013.01); *B28D 5/0082* (2013.01)

(58) Field of Classification Search
  None
  See application file for complete search history.

(56) References Cited

U.S. PATENT DOCUMENTS

| 4,546,231 A | 10/1985 | Gresser et al. |
| 9,214,353 B2 | 12/2015 | Yonehara et al. |
| 9,815,138 B2 | 11/2017 | Hirata |
| (Continued) | | |

FOREIGN PATENT DOCUMENTS

| JP | 2013049161 A | 3/2013 |
| JP | 5917862 B2 | 5/2016 |
| KR | 20020030988 A | 4/2002 |

OTHER PUBLICATIONS

International Search Report and Written Opinion, PCT Application No. PCT/US2019/043774, dated Oct. 22, 2019, 15 pages.

*Primary Examiner* — Thien F Tran
(74) *Attorney, Agent, or Firm* — Fenwick & West LLP

(57) ABSTRACT

A cleaving system employs a shaper, a positioner, an internal preparation system, an external preparation system, a cleaver, and a cropper to cleave a workpiece into cleaved pieces. The shaper shapes a workpiece into a defined geometric shape. The positioner then positions the workpiece such that the internal preparation system can generate a separation layer at the cleaving plane. The internal preparation system focuses a laser beam internal to the workpiece at a focal point and scans the focal point across the cleaving plane to create the separation layer. The external preparation system scores the external surface of the workpiece at a location coincident with the separation layer. The cleaver cleaves the workpiece by propagating the crack on the external surface along the separation layer. The cropper shapes the cleaved piece into a geometric shape as needed.

20 Claims, 13 Drawing Sheets

(56) References Cited

U.S. PATENT DOCUMENTS

| | | |
|---|---|---|
| 9,878,397 B2 | 1/2018 | Hirata et al. |
| 9,884,389 B2 | 2/2018 | Hirata et al. |
| 9,929,054 B2 | 3/2018 | Yonehara et al. |
| 9,941,130 B2 | 4/2018 | Hirata |
| 10,076,804 B2 | 9/2018 | Hirata et al. |
| 10,079,171 B2 | 9/2018 | Richter |
| 10,112,256 B2 | 10/2018 | Hirata |
| 10,141,219 B2 | 11/2018 | Drescher et al. |
| 10,280,107 B2 | 5/2019 | Swoboda et al. |
| 10,312,135 B2 | 6/2019 | Drescher et al. |
| 2005/0199592 A1 | 9/2005 | Iri et al. |
| 2009/0056513 A1 | 3/2009 | Baer |
| 2015/0038062 A1 | 2/2015 | Umeda et al. |
| 2015/0060509 A1 | 3/2015 | Iancu et al. |
| 2016/0031745 A1* | 2/2016 | Ortner .................. B23K 26/083 65/29.1 |
| 2016/0254232 A1 | 9/2016 | Drescher et al. |
| 2016/0303764 A1 | 10/2016 | Bollman et al. |
| 2016/0354863 A1 | 12/2016 | Hirata |
| 2017/0002479 A1 | 1/2017 | Henley |
| 2018/0043468 A1 | 2/2018 | Hirata |
| 2018/0370073 A1 | 2/2018 | Swoboda et al. |
| 2018/0085851 A1 | 3/2018 | Hirata |
| 2018/0126484 A1 | 5/2018 | Richter et al. |
| 2018/0133834 A1 | 5/2018 | Beyer |

\* cited by examiner

INCIDENT RADIATION INDUCED SUBSURFACE DAMAGE FOR CONTROLLED CRACK PROPAGATION IN MATERIAL CLEAVAGE

CROSS-REFERENCE TO RELATED APPLICATION

This application claims the benefit of U.S. Provisional Application No. 62/703,642 filed Jul. 26, 2018, and this application is a continuation of U.S. application Ser. No. 16/523,880 filed Jul. 26, 2019, the contents of both of which are hereby incorporated by reference in their entirety.

FIELD OF INVENTION

This invention relates generally to material processing and more specifically to using incident radiation to prepare workpieces for cleaving and for cleaving the workpiece.

DESCRIPTION OF RELATED ART

Semiconductors are an important and valuable material in the electronics and photovoltaics industries due to their unique properties, versatile applications and now widespread use. Semiconductors are often used in wafer form. However, current wafer fabrication methods are wasteful and can result in up to 50% material loss. Mechanical wire sawing of large semiconductor ingots/blocks into the thin wafer form is the industry standard, but kerf loss caused by the saw wire is inevitable. Sawing also damages the surface of the resultant wafers, leading to a need for damaged material removal and subsequent surface finishing to achieve the high-grade wafers that are required for many applications. Polishing and mechanical grinding are often used to finish the surfaces of wafers, and these post-processing steps remove even more material from the wafers, further increasing the overall material loss. High material loss during the manufacturing of semiconductor wafers results in less semiconductor material that can be used for applications and higher cost per wafer. A similar argument can be made for high grade insulators (e.g., such as silicon oxide, aluminum oxide, zirconium oxide, magnesium oxide, etc.) used in a wide range of industries for diverse applications.

Cleaving material workpieces via crack propagation is a promising alternative to current wafer processing methods because it results in little material loss. Further, it is seen that this type of cleaving results in higher quality wafer surfaces, potentially reducing or eliminating the need for post-processing steps to achieve high-quality surface finishes. However, efficiently producing wafers through such cleavage methods is challenging.

SUMMARY

Described is a cleaving system for precisely cleaving a workpiece into one or more cleaved pieces using a reduced amount of force compared to traditional technologies. The cleaving system includes a shaper, a positioner, an internal preparation system, an external preparation system, a cleaver, and a cropper.

The cleaving system may employ various methods to create cleaved pieces. For example, the shaper shapes a workpiece into a defined geometric shape such as a cylinder. In this manner, any of the cleaved pieces created by the cleaving system may be a cross-section of the defined geometric shape (e.g., a circle). The cleaving system determines a location of a cleaving plane internal to the workpiece. The positioner then positions the workpiece such that the internal preparation system can generate a separation layer at the cleaving plane.

To generate the separation layer, the internal preparation system focuses a laser beam internal to the workpiece at a focal point, creating a localized region in the workpiece ("footprint") where the mechanical properties have changed. The internal preparation system scans the laser beam across the cleaving plane to create the separation layer through the generation of many footprints. The separation layer is a layer of material within the workpiece that is structurally dissimilar to the material surrounding the separation layer. The structural dissimilarities between the separation layer and the surrounding material facilitate cleaving the workpiece into cleaved pieces. More than one separation layer may be created internal to the workpiece.

The external preparation system scores the external surface of the workpiece at a location coincident with the separation layer. The cleaver then cleaves the workpiece by propagating the crack on the external surface along the separation layer. More particularly, the cleaving system applies a tensile force on opposing ends of the workpiece which propagates the crack along the dissimilar material of the separation layer and thereby generating a cleaved piece. The cropper shapes the cleaved piece into any geometric shape as needed.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Overview

Figure 1:
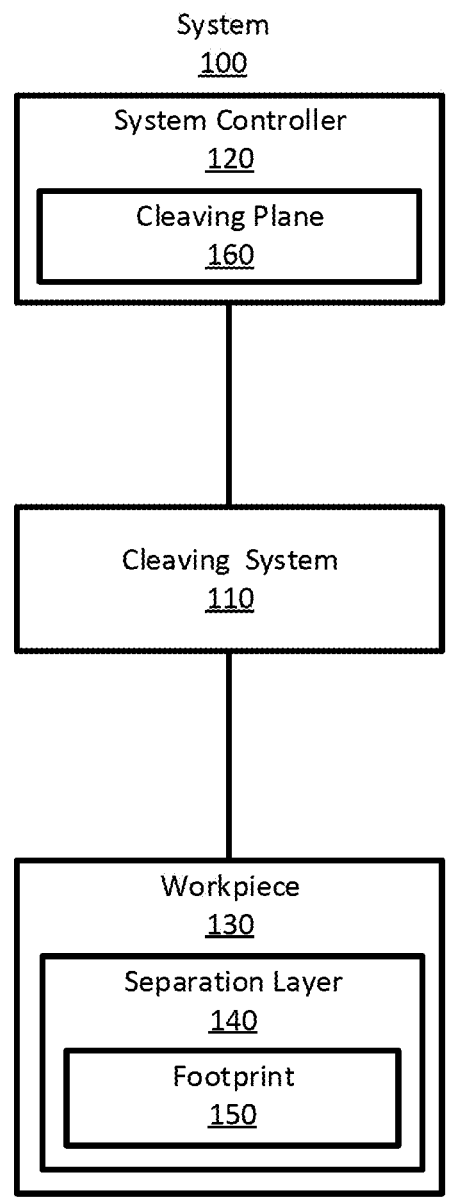
FIG. 1 illustrates a system for cleaving a workpiece, according to one example embodiment.

FIG. 1 illustrates a system environment 100 for cleaving a workpiece 130, according to one embodiment. The environment 100 includes a system controller 120, a cleaving system 110, and a workpiece 130. Within the environment 100, the system controller 120 determines a cleaving plane 160 for the workpiece 130. The system controller 120 controls the cleaving system 110 to create a separation layer 140 within the workpiece 130 along the cleaving plane 160. To do so, the cleaving system 110 creates footprints 150 within the workpiece 130 that facilitate the cleaving system 110 cleaving the workpiece 130. The system controller 120 then controls the cleaving system 110 to cleave the workpiece along the separation layer 140.

Cleaving System

Figure 2:
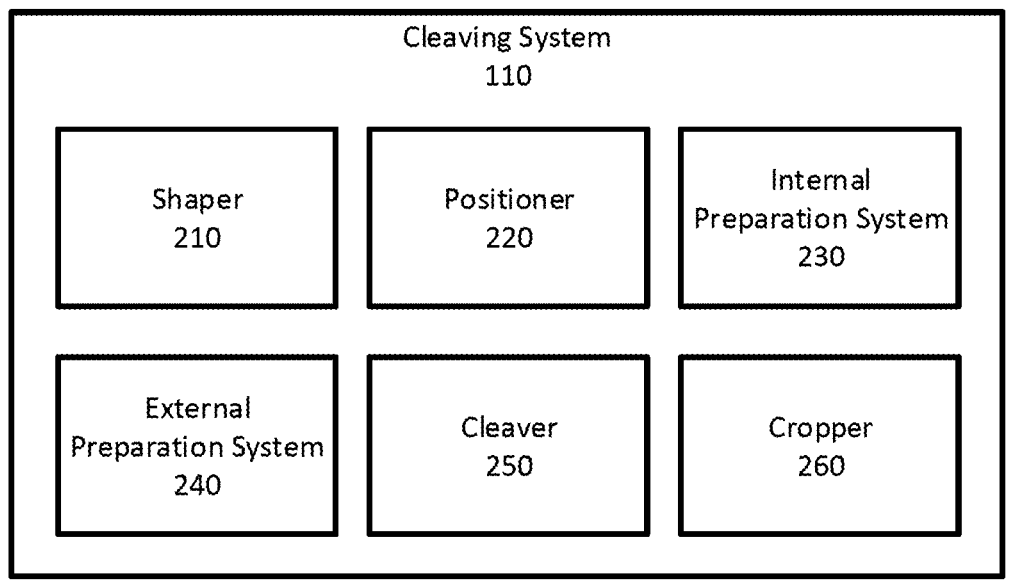
FIG. 2 illustrates a cleaving system for cleaving a workpiece, according to one example embodiment.

FIG. 2 illustrates a cleaving system 110 within the environment 100. The cleaving system 110 cleaves a workpiece 130 into two or more pieces. When the workpiece 130 is a semiconductor ingot, the cleaving system 110 may cleave the semiconductor ingot into one or more semiconductor wafers.

The cleaving system 110 includes a shaper 210, a positioner 220, an internal preparation system 230, an external preparation system 240, a cleaver 250, and a cropper 260.

The shaper 210 shapes the workpiece 130 such that the workpiece 130 can be cleaved by the cleaving system 110. Shaping the workpiece 130 may include shaping the workpiece 130 into a known geometry such as a cylinder, a rectangular prism, or some other shape. In some examples, shaping the workpiece 130 may include either adding or removing material from the workpiece 130. Removing material from the workpiece 130 can be accomplished by a saw, a grinder, an etching process, or some other instrument or process that can remove material from the workpiece 130. Adding material to the workpiece 130 can be accomplished by chemical vapor deposition, thermal oxidation, atomic layer deposition, or any other method of adding material to the work piece. In some cases, the shaped workpiece 130 may be received from an outside source or vendor. Whatever the case, the shaped workpiece 130 has a shape that can be cleaved by the cleaving system 110.

The shape of the workpiece 130 is selected based on the desired shape of the cleaved pieces. Some examples include workpieces 130 with a circular, rectangular, square or pseudo-square cross-sectional area to produce pieces of that same shape. In other examples, the shape of the workpiece 130 is not the shape of the produced piece. For the formation of commercially viable pieces (e.g., wafers), adhering to industry standards may be preferable. For example, 4-inch circular wafers are a standardized, commonly used type of wafer, so the workpiece 130 used to form those wafers would be cylindrical with a cross-sectional area of a circle with a 4-inch (or 100-millimeter) diameter. Other standard diameters for circular wafers include 1 inch (25 millimeters), 2 inches (51 millimeters), 3 inches (76 millimeters), 5.9 inches (150 millimeters), 7.9 inches (200 millimeters), 11.8 inches (300 millimeters), and 17.7 inches (450 millimeters). Standard side lengths for pseudo-square wafers include 125 millimeters and 156 millimeters, which are fabricated from initial cylindrical pieces with diameters of 165 millimeters and 210 millimeters, respectively. Additionally, the workpiece 130 may include notches or flats according to industry standards. These features can indicate the orientation of the crystal structure of the material if it is single-crystalline. For example, an n-doped (100) silicon wafer has two flats that are parallel to each other, and could be made from a workpiece 130 that is cylindrical with two parallel flats cut on opposite sides of the length of the cylinder.

Additionally, a cropper 260 can precisely crop the cleaved piece to the desired geometry after the cleaver 250 has cleaved the workpiece 130. This allows the cleaving system 110 to cleave the workpiece 130 while it is one shape but generate cleaved pieces of a final geometry. For example, the cleaver 250 is configured to cleave square-shaped workpieces 130. As such, the shaper 210 shapes the workpiece 130 to a square and cleaves the workpiece 130 into square wafers. However, in this case, the desired shape of the wafer is a circle. Accordingly, the cropper 260 crops the square wafers into circular wafers of the desired geometry. The cropper 260 accomplishes its function through any method of removing material from the wafers, including but not limited to laser cutting, wafer sawing, chemical etching, water jet cutting, and so forth.

Additionally, the workpiece 130 may be shaped such that two surfaces of the workpiece 130 are parallel to a cleaving plane 160. The cleaving plane 160 is the plane of the workpiece 130, predefined by the separation layer 140 and determined by the system controller 120, that the cleaver 250 cleaves along. In various embodiments, the cleaving plane may be topological surfaces other than a two-dimensional plane. The two surfaces may be parallel to the cleaving plane 160 such that the cleaver 250 may cleave the workpiece 130 more efficiently. An example of this process is described in more detail in regards to FIGS. 7A-8C. Generally these two surfaces, or faces, are on opposing ends of the workpiece 130. For example, for a workpiece 130 that is a cylindrical, single-crystalline silicon ingot with the long axis of the ingot perpendicular to the (100) crystallographic plane, the shaper 210 may shape the workpiece 130 such that it has two faces with the same (100) crystallographic orientation on the opposing ends of the ingot.

Outer surfaces of the shaped workpiece 130 may include residual surface roughness. Accordingly, in some configurations, the shaper 210 prepares the surface of the workpiece 130 for cleaving by reducing the surface roughness. In various embodiments, the shaper 210 prepares the surface using a mechanical polish, a chemical-mechanical polish, a wet-etching process (e.g., a chemical-etching process), a dry-etching process (e.g., reactive-ion etching), a thermal surface reflow process, or any other process that can prepare the surface of the workpiece 130 for cleaving.

The positioner 220 positions the workpiece 130 and/or the cleaving system 110 during the cleaving process. In one example, the positioner 220 positions the workpiece 130 while the cleaving system 110 remains stationary. Alternatively, the positioner 220 positions the cleaving system 110 while the workpiece 130 remains stationary. In some cases, the positioner 220 simultaneously positions both the cleaving system 110 and the workpiece 130. Most generally, the positioner 220 facilitates cleaving the workpiece 130 by appropriately aligning the cleaving system 110 and the workpiece 130. The positioner 220 can be any number of elements capable of positioning the workpiece 130 or cleaving system 110. For example, the positioner 220 may include components such as motors, positioning stages, piezo-electrics, and mounting fixtures along with the appropriate sensing elements to detect the position of the workpiece 130 and cleaving system 110 as well as the control systems necessary to accurately position them for subsequent processing.

The internal preparation system 230 prepares the workpiece 130 for cleaving by creating a separation layer 140. A separation layer 140 is a layer of material within the workpiece 130 distinct from the surrounding material that facilitates cleaving along the plane of the separation layer 140. Generally, the separation layer 140 is coplanar with, or has the same orientation as, the cleaving plane 160. To create the separation layer 140, the internal preparation system 230 generates a laser beam and focuses the laser beam at a focal point internal to the workpiece 130 (i.e., a footprint 150). In other configurations, the internal preparation system can generate any other type of incident radiation that may create a footprint 150 internal to a workpiece 130. Generally, the laser changes the structure of the workpiece 130 at the footprint 150 so as to locally weaken the material thereby creating a preferred location for crack propagation. The structure of the workpiece 130 is not substantially modified at any location other than the footprint 150. As an example, the internal preparation system 230 may create an amount of thermal energy at the footprint 150 that melts the material of the workpiece 130 in that region.

The internal preparation system 230, working in tandem with the positioner 220, creates footprints 150 within the workpiece 130 along the cleaving plane 160. As such, the footprints 150, in aggregate, change the structure of the workpiece 130 in the cleaving plane 160 to create a separation layer 140. Because the structure of the workpiece 130 in the separation layer 140 is dissimilar to the structure surrounding the separation layer 140, the workpiece 130 is more likely to cleave along the plane of the separation layer 140. The process of creating a separation layer 140 is described in more detail in regards to FIG. 6.

Figure 3:
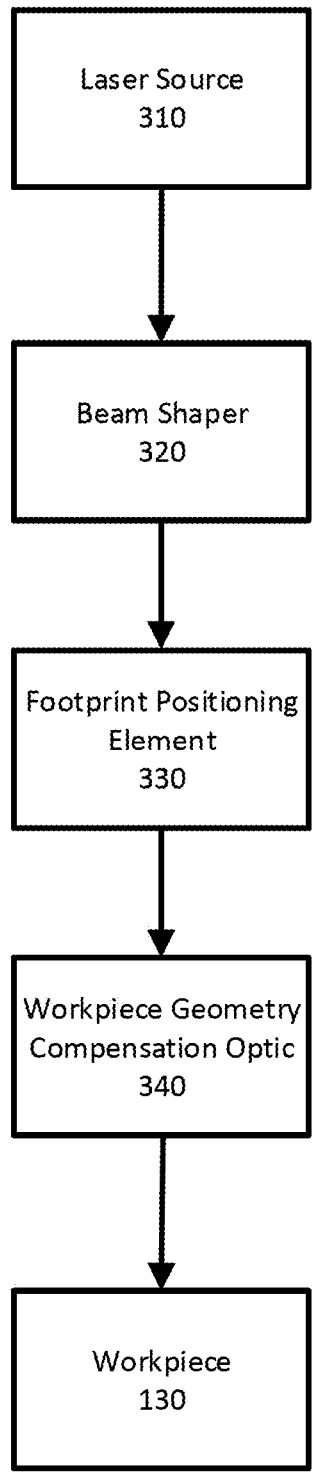
FIG. 3 illustrates an internal preparation system, according to one example embodiment.

FIG. 3 illustrates the internal preparation system 230 in more detail. The internal preparation system 230 includes a laser source 310, a beam shaper 320, a footprint positioning element 330, and a workpiece geometry compensation optic 340.

The laser source 310 generates pulses of radiation at a repetition rate. The repetition rate is generally at least 100 kHz, but could be a lower repetition rate as well. The laser pulses form a collimated symmetrical laser beam. The laser beam has a wavelength longer than the workpiece 130 material's electronic band gap such that when the laser enters the workpiece 130, the material of the workpiece 130 is not electronically excited. Generally, the laser source 310 has a wavelength between, for example, 0.2 and 20 µm. This allows the internal preparation system 230 to create separation layers 140 for workpieces 130 with electronic bandgaps between, for example, 0.1 and 10 eV.

In an embodiment, a beam shaper 320 creates an asymmetric laser beam. The optics of the beam shaper 320 may operate as a cylindrical telescope creating an asymmetric laser beam. The asymmetric laser beam allows for creating a larger footprint 150 when focused in the workpiece 130. Creating a larger footprint 150 from a single pulse allows for faster fabrication of the separation layer 140 for the same laser repetition rate. The asymmetric beam may also enable generation of a thinner separation layer 140. The thinner separation layer 140 allows the cleaver 250 to use lower force to cleave a workpiece 130 and provides less roughness on the resulting separated surfaces. In one embodiment, the major axis of the asymmetric laser beam is parallel to the long axis of the workpiece 130. In another embodiment, the major axis of the asymmetric laser beam is perpendicular to the long axis of the workpiece 130. The laser beam may be re-collimated after the beam shaper 320. An asymmetric laser beam may not be necessary for some workpiece shapes.

A footprint positioning element 330 focuses the laser beam to a footprint 150 inside the workpiece 130. Generally the footprint 150 geometry in the cleaving plane 160 is configurable while the footprint 150 thickness, which determines the thickness of the separation layer 140, is less than, for example, 20 µm but may be any other size. In one embodiment, the footprint positioning element 330 is a rotationally symmetric, positive focal length optic. The footprint positioning element 330 may move along the laser beam's axis of propagation. Movement of the footprint positioning element 330 along this axis allows the depth of the footprint 150 in the workpiece 130 to be varied along the same axis.

In an embodiment, the workpiece 130 and workpiece geometry compensation optic 340 could be moved in unison relative to the footprint positioning element 330 to also vary the depth of the footprint 150 in the workpiece 130. In some cases, the depth of the footprint 150 within the workpiece 130 can be well over, for example, 1 mm. The depth of the footprint 150 within the workpiece 130 is only limited by the optical transmission of the workpiece 130 material and laser parameters, such as average power, peak power, and wavelength. Workpiece 130 material properties affect the laser parameters (i.e. wavelength, peak power, average power) that enable the creation of a footprint 150 in the workpiece 130. For example, a laser with a first wavelength may be employed to generate a footprint in a workpiece of a first material, and a laser with a second wavelength may be employed to generate a similar footprint in a workpiece of a second material. Other examples are also possible.

A workpiece geometry compensation optic 340 compensates for the shape of the workpiece 130 surface and reduces the effect of aberrations, such as astigmatism, for varying locations of the footprint positioning element 330, maintaining the fluence necessary to create a footprint 150 in the workpiece 130. The workpiece geometry compensation optic 340 may contain more than one element to compensate for a single aberration or many aberrations. This optic may not be necessary for some workpiece shapes.

In aggregate, the internal preparation system 230 and the positioner 220 are configured to create a footprint 150 at any position within the workpiece 130. Further, the configuration of the internal preparation system 230 controls the shape and dimensions of the footprint 150. For example, one configuration of the internal preparation system 230 produces a footprint 150 that is a 4-µm by 20-µm ellipse in the separation layer 140, while another configuration produces a footprint 150 that is a 20-µm diameter circle in the separation layer 140. As previously discussed, the thickness of the footprint 150 will be primarily determined by the beam shaper 320 and footprint positioning element 330 configuration, but will generally be less than 20 µm.

The internal preparation system 230 may have several other optics combinations that function similarly. For example, refractive optical elements may be replaced by reflective optics (curved mirrors). The beam shaper 320 can be an anamorphic prism pair instead of a cylindrical telescope. The workpiece geometry compensation optic 340 may be replaced by a free-form optic that would help compensate for any aberrations caused by previous optics in addition to compensating for the shape of the workpiece 130.

The external preparation system 240 prepares the workpiece 130 for cleaving by scoring the external surface of the workpiece 130. Scoring the external surface of the workpiece 130 introduces a crack to the workpiece 130. The cleaver 250 propagates the crack through the workpiece 130 along the separation layer 140 to cleave the workpiece 130 into multiple pieces. Generally, the external preparation system 240 scores the workpiece 130 at the same location as the separation layer 140 (e.g., coplanar with, coincident to, etc.) along which cleaving is desired but can score the workpiece 130 in other locations as needed. The scoring location may be a point, several points, a line, or several lines, as needed. To illustrate, for example, the scoring location is, approximately, a circumferential scribe along the outer surface of the workpiece 130. In one embodiment, the function of the external preparation system 240 is performed by some or all of the components of the internal preparation system 230.

The external preparation system 240 can score the workpiece 130 in a number of ways. For example, the external preparation system 240 may score the workpiece 130 by ablating material of the workpiece 130 with a laser, physically removing material of the workpiece 130 (with a mechanical scribe, saw, chisel, etc.), etching the workpiece 130 (with a gas, chemical, plasma. etc.), or any other process that can score the workpiece 130.

In an instance where the external preparation system 240 scores the workpiece 130 at the same location as the separation layer 140, scoring the surface may partially propagate a crack at the perimeter of the separation layer 140. The partially propagated crack further propagates through the separation layer 140 when the workpiece 130 is cleaved. For example, the internal preparation system 230 creates a separation layer 140 on a (100) plane of a silicon workpiece 130. The external preparation system 240 scores the silicon workpiece 130 along the perimeter of separation layer 140 and introduces a crack on the (100) plane. Accordingly, when the cleaver 250 cleaves the silicon workpiece 130, the crack propagates through the entire separation layer 140 along the (100) plane. The degree the crack propagates along the separation layer 140 depends on characteristics of the separation layer 140 (e.g., thickness, uniformity, etc.), the method of scoring the workpiece 130 (e.g., ablation, physical removal, etc.), and the material and orientation of the workpiece 130 (e.g., crystallographic orientation, composition, etc.).

The cleaver 250 cleaves the workpiece 130 into one or more pieces. In one example, the cleaver 250 applies a mechanical tensile force 440 normal to the separation layer 140 to cleave the workpiece 130. In one embodiment, the mechanical tensile force 440 is applied to the workpiece 130 through electrostatic clamps 410 affixed to opposing ends of the workpiece 130. A voltage 416 between the electrostatic clamps 410 and the workpiece 130 is applied to securely affix them together. The workpiece 130 is cleaved when a mechanical tensile force 440 is applied to pull the electrostatic clamps 410 apart in a controlled fashion.

Figure 4:
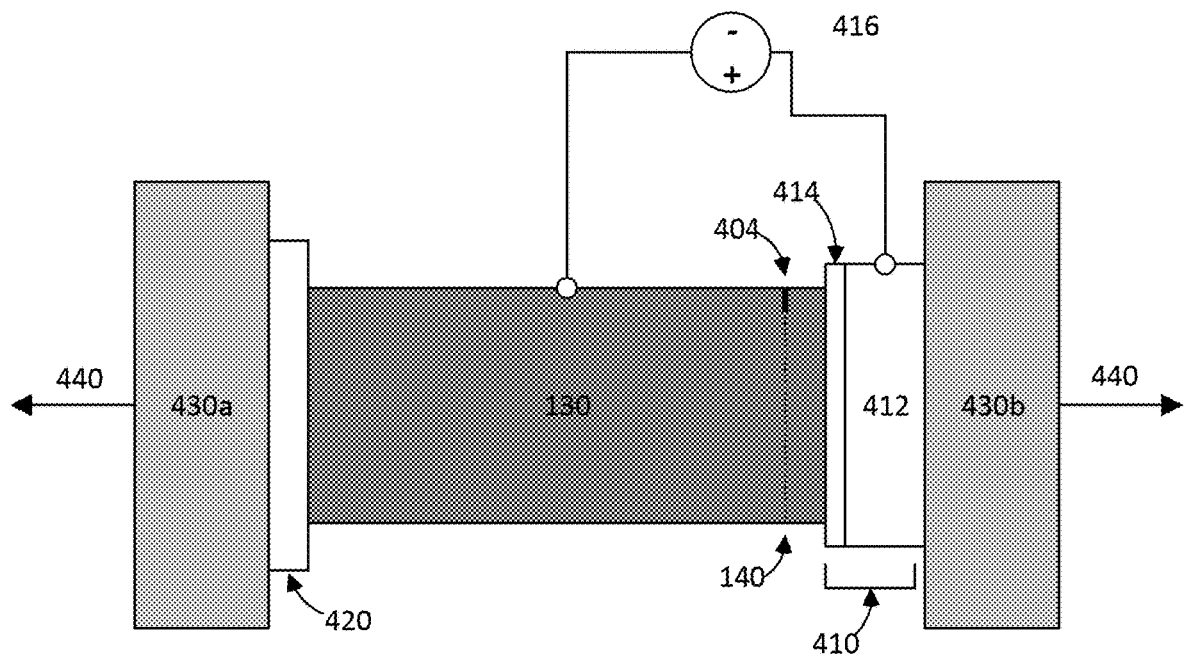
FIG. 4 illustrates a cleaver, according to one example embodiment.

FIG. 4 illustrates an example process of cleaving a workpiece 130 with a cleaver 250 (e.g., a capacitive clamp 410). A capacitive clamp 410 includes a non-conductive layer 414 and a conductive main body 412. The non-conductive layer 414 is proximate to one face of the conductive main body 412. In some embodiments, the non-conductive layer 414 is deposited directly onto the face of the conductive main body 412 such that they are chemically adhered. In many embodiments, the other face of the conductive main body 412 is secured to some sort of support 430. This can be done by any suitable means for mechanically or chemically fastening or attaching the two materials. If the support 430 is made of metal or another conductive material, using a non-conductive method of attachment prevents the voltage 416 that is applied to the conductive main body 412 from also being applied to the support 430 and potentially causing a short-circuit or some other harm. In one embodiment, the workpiece 130 can be affixed to the clamp 420 using an epoxy or other type of adhesive and clamp 420 will remain permanently affixed to the workpiece 130 as clamp 410 cleaves multiple pieces from it in a repeated fashion. In some embodiments, the shape of the capacitive clamp 410 matches the cross-sectional geometry of the workpiece 130.

The capacitive clamp 410 secures the workpiece 130 by creating electrostatic forces like those experienced by the plates of a parallel plate capacitor. A voltage supply 416 is used to energize the conductive main body 412 to a high voltage, while the workpiece 130 is either energized to the opposite polarity or grounded. Additionally, the non-conductive layer 414 prevents any charge from passing from the conductive main body 412 to the workpiece 130, and vice versa. Thus, charges gather at the nearest surfaces of both the conductive main body 412 and the workpiece 130. Because these charges are opposite and thus attract, an electric field is created within the non-conductive layer 414 and an associated electrostatic force is also created.

Though the strength of the electrostatic force necessary to secure the workpiece 130 to the capacitive clamp 410 can vary, the applied compressive stress is usually on the order of $10^6$ to $10^8$ Pa. This stress is typically created by applying voltages 416 from the range, including but not limited to, of 100 V to 500 kV, depending on the thickness and dielectric properties of the non-conductive layer 414. For example, a 100-V bias applied across a 100-nm thick $HfO_2$ non-conductive layer 414 will generate a compressive stress of approximately $10^8$ Pa. Similarly, a 500-kV bias applied across a 500-μm thick quartz non-conductive layer 414 will generate a compressive stress of approximately $10^7$ Pa. Fracture mechanics analyses indicate that the stress necessary to propagate crack 404 is primarily dependent on the initial crack depth and the sharpness of the crack tip. For example, if the crack 404 partially propagated along the separation layer 140 created by the internal preparation system 230, the amount of force required to cleave the workpiece 130 would be decreased. Flexibility in the depth of initial crack 404 results in flexibility in the required electrostatic force and hence required voltage 416 for propagation.

The finish of the surface of the capacitive clamp 410 can affect the strength and uniformity of the electrostatic force between the capacitive clamp 410 and the workpiece 130. Because air has a lower dielectric constant than the materials used for the non-conductive layer 414, air gaps between the workpiece 130 and the non-conductive layer 414 can reduce the electric field present between the workpiece 130 and the conductive main body 412 and thus reduce the resultant electrostatic force. Additionally, random placement of air gaps can affect the uniformity of the electric field between the conductive main body 412 and the workpiece 130, resulting in a less uniform electrostatic force. To reduce these effects, the contact surface of the non-conductive layer 414 can be made as atomically flat as possible (e.g., using methods like polishing) to reduce the presence of air between the capacitive clamp 410 and the workpiece 130. Polishing can also be used to prevent damage to the workpiece 130 if the material used for the non-conductive layer 414 is harder than the workpiece 130. In some embodiments, the surface finish depends on the materials used for the conductive main body 412 and the non-conductive layer 414. In some embodiments, the conductive main body 412 is made out of a semiconducting material.

The material used for the non-conductive layer 414 may affect the operation of the capacitive clamp 410 due to the magnitude of the electrostatic force required to cleave the workpiece 130. For the capacitive clamp 410 to function like a capacitor, the non-conductive layer 414 must be a dielectric material. The magnitude of electric field at which these materials breakdown, or lose their insulating properties, is known as dielectric strength. Because the electric field experienced by the non-conductive layer 414 is proportional to the electrostatic force produced by the capacitive clamp, it is advantageous to use a material with a high dielectric strength. Materials that have been found to be capable of withstanding the necessary magnitudes of electric fields are diamond, cubic boron nitride, aluminum nitride, hafnium oxide, silicon oxide, silicon nitride, niobium oxide, barium titanate, strontium titanate, lithium niobate, aluminum oxide, calcium fluoride, silicon carbide, and any combination thereof. However, this list is not limiting, as it is feasible that other materials with similarly high dielectric strengths would also work for this purpose. A secondary dielectric material consideration is dielectric constant. Higher values of dielectric constant result in lower voltages, and hence electric fields, that need to be applied to achieve the same magnitude electrostatic forces. The ideal material used for the non-conductive layer 414 is therefore one with both high dielectric strength and high dielectric constant.

In some embodiments, the dielectric material used for the non-conductive layer 414 is coated with a thin layer of a different material. If the dielectric material is too hard and causes damage to the workpiece 130 during clamping, the thin layer coating can be of a softer dielectric material that does not damage the workpiece 130. If the dielectric is too soft and incurs damage during clamping, the thin layer coating can be a harder dielectric material that better withstands the forces associated with clamping.

Workpiece

Though this system is particularly applicable to semiconductor manufacturing, the workpiece 130 can be made of materials other than a semiconducting material. In various embodiments, the workpiece 130 should be conductive or semi-conductive such that charge can flow to the surface of the workpiece 130 that mates with the capacitive clamp 410 when voltage 416 is applied between the workpiece 130 and the conductive main body 412. Examples of workpiece 130 materials that meet these requirements include many semiconductors, such as silicon, silicon carbide, indium phosphide, gallium phosphide, germanium, gallium arsenide and gallium nitride. If the material used for the workpiece 130 is not conductive enough to meet those requirements, a smaller electrostatic force will be generated, and the capacitive clamp 410 may not be able to secure the workpiece 130 as strongly as necessary for the cleaving process. However, those properties can still be achieved with a workpiece 130 made of an insulating material, such as silicon oxide, aluminum oxide, zirconium oxide and magnesium oxide. For example, in one embodiment, the shaper 210 may apply a thin conductive coating that is strongly bonded to the surface of the insulating material. To be considered strongly bonded, the thin conductive coating must be able to stay bonded to the surface of the insulating material during the application of the electrostatic and tensile forces used in the cleaving process.

The positioning of the separation layer 140 in the workpiece 130 can determine the crystal orientation of resultant wafers. In many embodiments, the separation layer 140 is aligned with a specific crystallographic plane within the workpiece 130. Thus, the crystal orientation of the resultant wafers is the same as the chosen crystallographic plane. Standard crystal orientations for crystalline silicon include (100), (111), and (110).

System Controller

In various embodiments, the system controller 120 controls the various elements of the cleaving system 110 to cleave the workpiece 130.

The system controller 120 determines a shape of the workpiece 130 based on the desired shape of the cleaved pieces. For example, if the desired shape of the cleaved pieces is round, the controller 120 controls the shaper 210 to shape the workpiece 130 into a cylindrical shape. In one embodiment, the system controller 120 additionally controls an optional cropper 260 subsystem to crop a cleaved piece into a final desired geometry. Generally, controlling the shaper 210 includes generating the electrical signals to control the various elements of the shaper 210 that may shape the workpiece 130. Similarly, controlling the cropper 260 includes generating the electrical signals to control the various elements of the cropper 260 that may crop the cleaved piece into a specified, final geometry.

The system controller 120 determines the position of the workpiece 130, the external preparation system 240, and internal preparation system 230 while the workpiece 130 is prepared to be cleaved and cleaved. Determining the position can include determining a spatial position of the workpiece 130 or elements of the cleaving system 110 such that the cleaving plane 160 of the workpiece 130 is irradiated by the internal preparation system 230. Once the position is determined, the system controller 120 can generate a control signal for the positioner 220 that positions the workpiece 130 or elements of the cleaving system 110. Similarly, the system controller 120 can generate control signals such that the positioner 220 positions any other element of the cleaving system 110 or the workpiece 130.

The system controller 120 determines and adjusts operational characteristics for the internal preparation system 230. In one example, the system controller 120 determines and adjusts characteristics of the laser beam emitted by the laser source 310. The one or more laser beam characteristics can be determined, for example, based on the characteristics of the workpiece 130, the position of the separation layer 140, etc. The characteristics of the laser source 310 and laser beam can include wavelength, power, pulse rate, etc. Additionally, the system controller 120 can determine and adjust the appropriate position of the various optical elements to create a footprint 150 and separation layer 140 internal to the work piece 130. The optical elements can further be configured to control the size, shape, and location of the footprint 150.

The system controller 120 determines and adjusts operational characteristics for the external preparation system 240. In one example, the system controller 120 determines and adjusts the position of the workpiece 130 and external preparation system 240 when scoring the outside of the workpiece 130. The system controller 120 can also determine and adjust the depth, width and overall shape of the introduced crack.

The system controller 120 controls the operation of the cleaver 250. That is, the system controller generates the necessary voltages and signals for the cleaver 250 to cleave the workpiece 130. In one embodiment, the system controller 120 controls a cleaver 250 based on the capacitive clamp design illustrated in FIG. 4.

Cleaving Process

Figure 5:
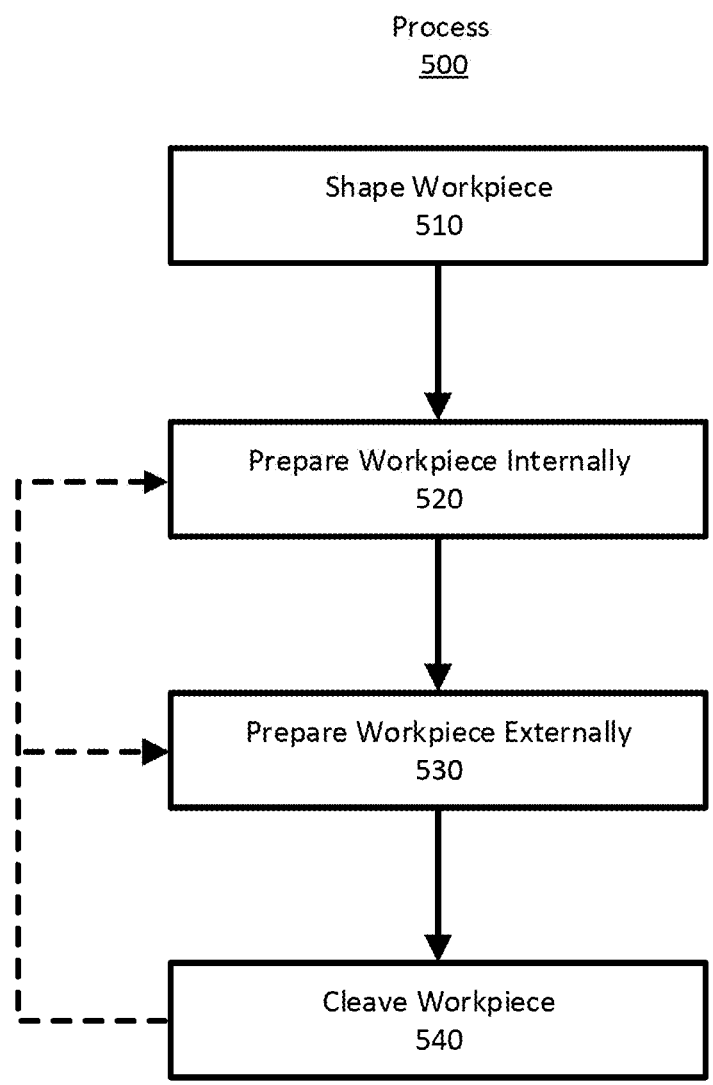
FIG. 5 is a process flow for cleaving a workpiece, according to one example embodiment.

FIG. 5 is a flow diagram of a process 500 for cleaving a workpiece 130 with a cleaving system 110.

The system controller 120 determines a shape of the workpiece 130 based on the desired shape of the cleaved pieces. Based on the determined shape, the shaper 210 shapes 510 the workpiece 130 to the desired shape. For example, if the shaped workpiece 130 is to be square, the shaper 210 shapes 510 the workpiece 130 into a square prism with the necessary geometric specifications and tolerances needed to accomplish the remainder of the cleaving process successfully.

The system controller 120 determines a position for a cleaving plane 160 within the workpiece 130. The internal preparation system 230 prepares 520 the workpiece 130 internally by creating a separation layer 140 at the desired cleaving plane 160 within the workpiece 130. In some cases, the internal preparation system 230 creates multiple separation layers 140 within the workpiece 130. These processes are described in more detail in regards to FIG. 6.

The system controller 120 determines a position to introduce a crack to the workpiece 130. The external preparation system 140 prepares 530 the workpiece 130 externally by creating a crack 404 on an exterior surface that will propagate through the workpiece 130 along the separation layer 140 when cleaved. Generally the crack 404 is along the perimeter, or a portion of the perimeter, of the separation layer 140 prepared by the internal preparation system 230. In some cases, the external preparation system 140 introduces several cracks 404 along the exterior surface of the workpiece 130.

The system controller 120 generates signals for the cleaver 250 to cleave 540 the workpiece 130. In one embodiment, cleaving the workpiece 130 propagates the crack 404 along the separation layer 140 by creating a mechanical tensile force 440 on opposing ends of the workpiece 130. That is, the workpiece 130 is cleaved by pulling it apart into two pieces at the separation layer 140. Generally, the workpiece 130 is cleaved such that the cleaved surface is orthogonal to the long axis of the workpiece 130. In another embodiment, cleaving the workpiece 130 propagates the crack 404 by creating a stress inside the workpiece 130 through applying a controlled shear force to the workpiece such that the crack 404 propagates preferentially along the separation layer 140. In yet another embodiment, cleaving the workpiece 130 propagates the crack 404 by creating a general mechanical stress, consisting of a variable combination of compression, tension, shear, bending, torsion or fatigue stresses, inside the workpiece 130 such that the crack 404 propagates preferentially along the separation layer 140. In yet another embodiment, cleaving 540 the workpiece 130 propagates the crack 404 along the separation layer 140 through the application of a thermal stress which can be achieved through rapid heating or cooling of the workpiece 130. In yet another embodiment, cleaving 540 the workpiece 130 propagates the crack 404 along the separation layer 140 through the application of a forceful vibration which can be achieved through a piezoelectric actuator, magnetostrictive actuator or similar device which generates powerful sound waves in the workpiece 130. In yet another embodiment, cleaving 540 the workpiece 130 can be achieved through any combination of the methods described above.

The system may cleave 540 the workpiece 130 any number of times. In various embodiments, this can include preparing 520 the workpiece 130 internally, preparing 530 the workpiece externally, and cleaving 540 the workpiece 130 any number of times. These steps can occur in different permutations and be repeated any number of times based on the configuration of the cleaving system 110.

Internal Preparation

Figure 6:
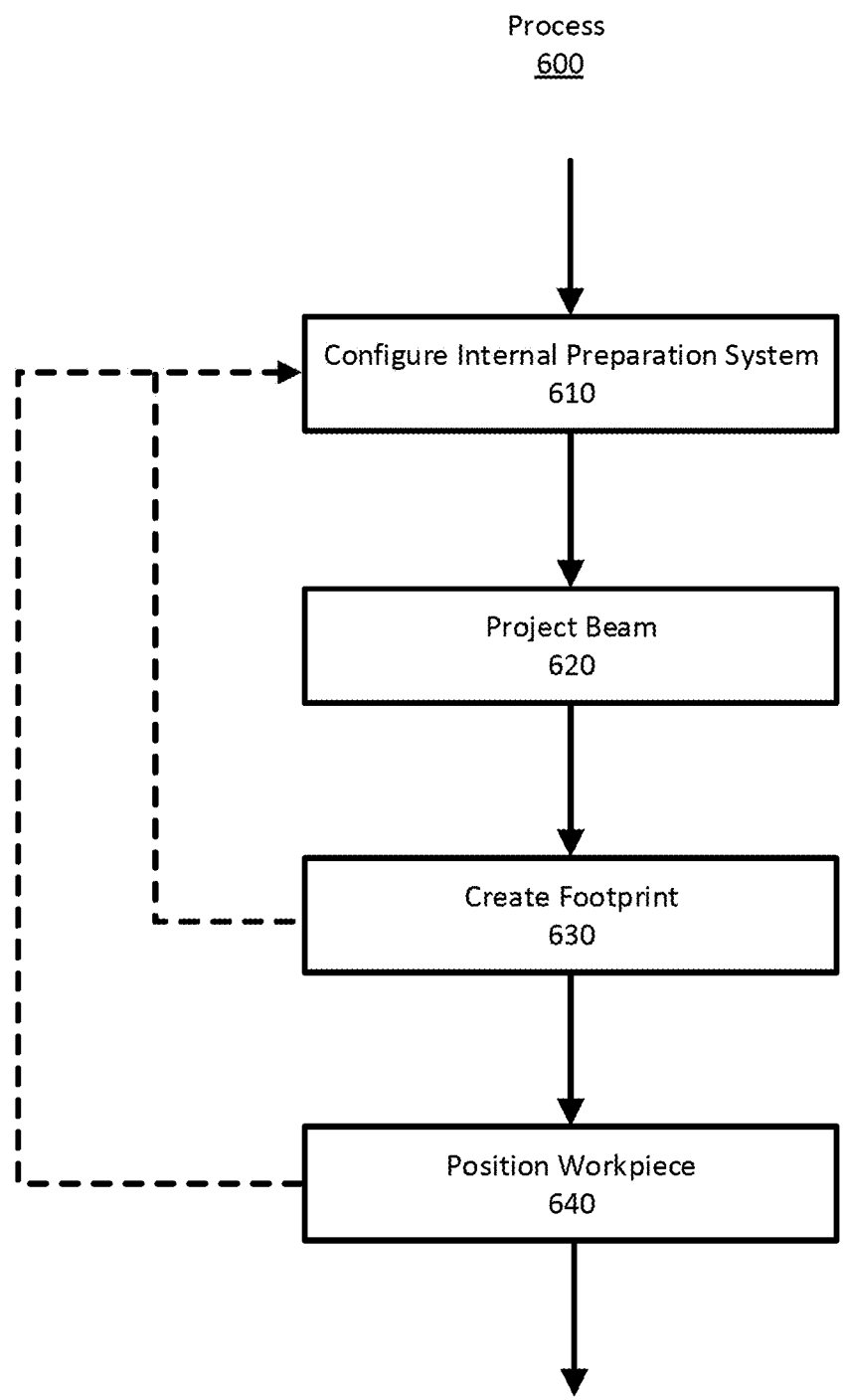
FIG. 6 is a process flow for creating a separation layer internal to a workpiece, according to one example embodiment.

FIG. 6 is a flow diagram of a process 600 for preparing a workpiece 130 internally with an internal preparation system 230.

Here, the system controller 120 has determined a cleaving plane 160 for the workpiece 130. As such, the system controller 120 configures 610 the internal preparation system 230 to create a separation layer 140 at the desired cleaving plane 160 within the workpiece 130. Configuring the internal preparation system 230 can include positioning optics, positioning the workpiece 130, configuring laser source 310 parameters, etc. such that the internal preparation system 230 creates the appropriate footprint 150 within the workpiece 130.

Next, the system controller 120 controls the laser source 310 to project 620 a laser beam towards the workpiece 130. The laser beam is focused into the workpiece 130 by the various optics of the internal preparation system 230. The laser beam creates 630 a footprint 150 internal to the workpiece 130 along the desired cleaving plane 160 that changes the structure of the workpiece 130 in that area.

Figure 7A:
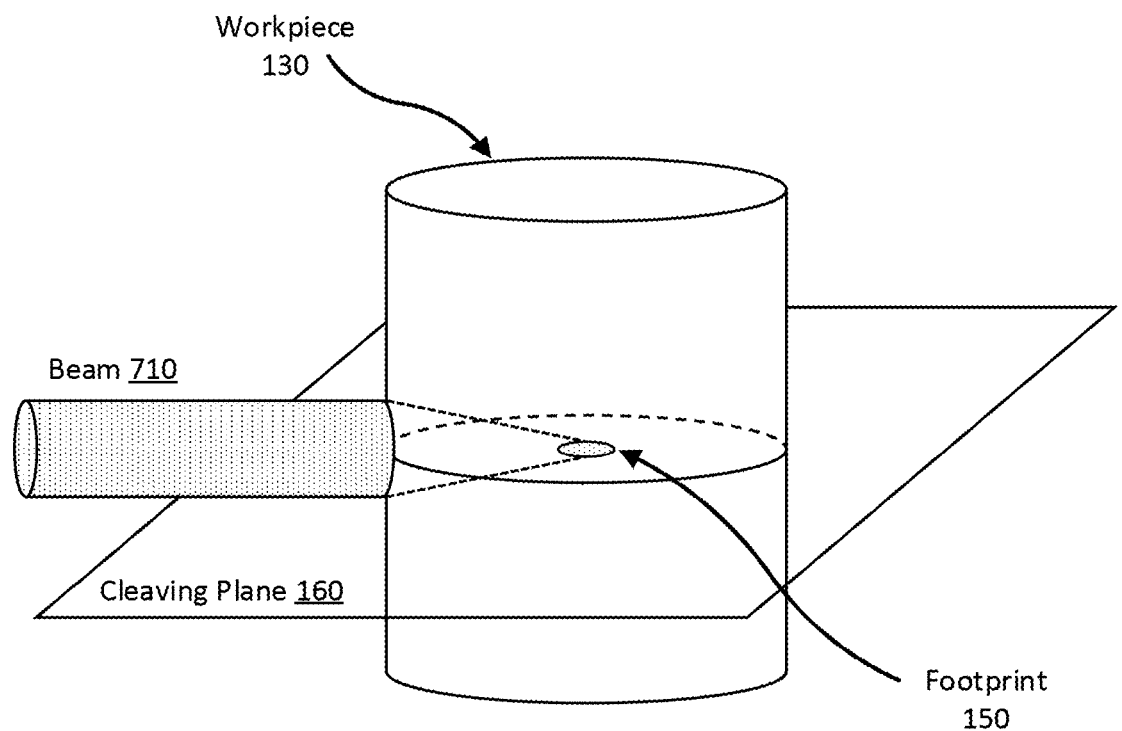
FIGS. 7A-7D illustrate the creation of a separation layer internal to a workpiece, according to one example embodiment.
Figure 7B:
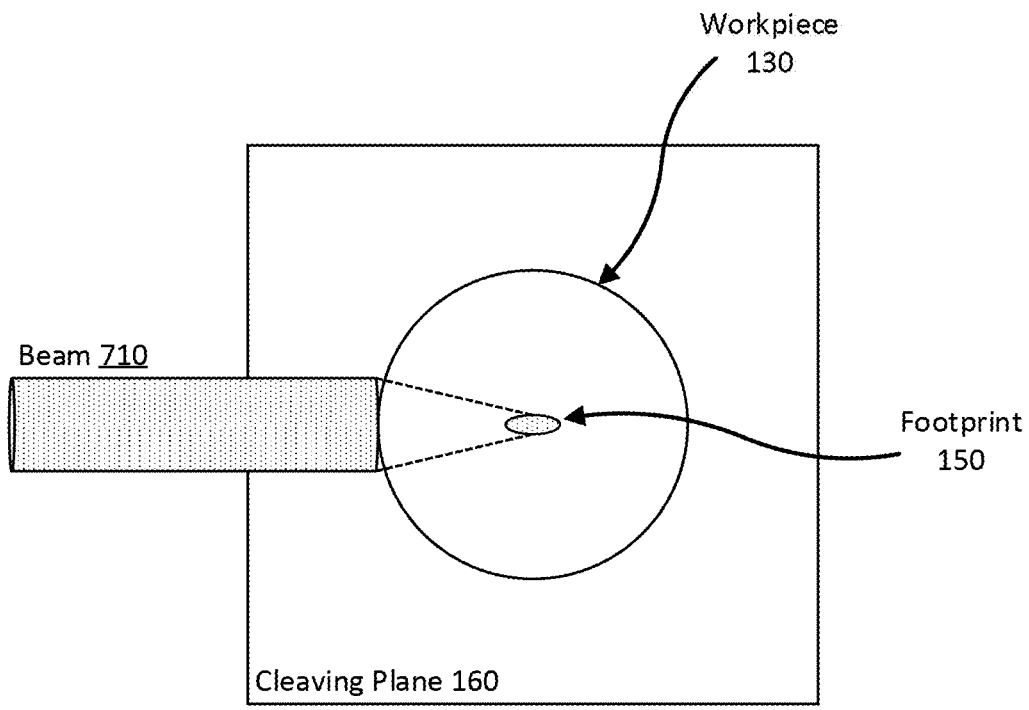

An example of internally preparing a workpiece 130 for cleaving by creating 630 a footprint 150 is illustrated in FIGS. 7A and 7B. FIG. 7A is an isometric view of the workpiece 130 during internal preparation and FIG. 7B is a cross-sectional view of the workpiece 130 during internal preparation.

In this example the workpiece 130 is a cylindrical ingot because the cleaved piece will be circular. The cleaving plane 160 is orthogonal to the long axis of the workpiece 130. The laser beam 710 is incident onto the surface of the workpiece 130 and focused to a footprint 150. The footprint 150 is coplanar with, or similarly orientated to, the cleaving plane 160.

Figure 7C:
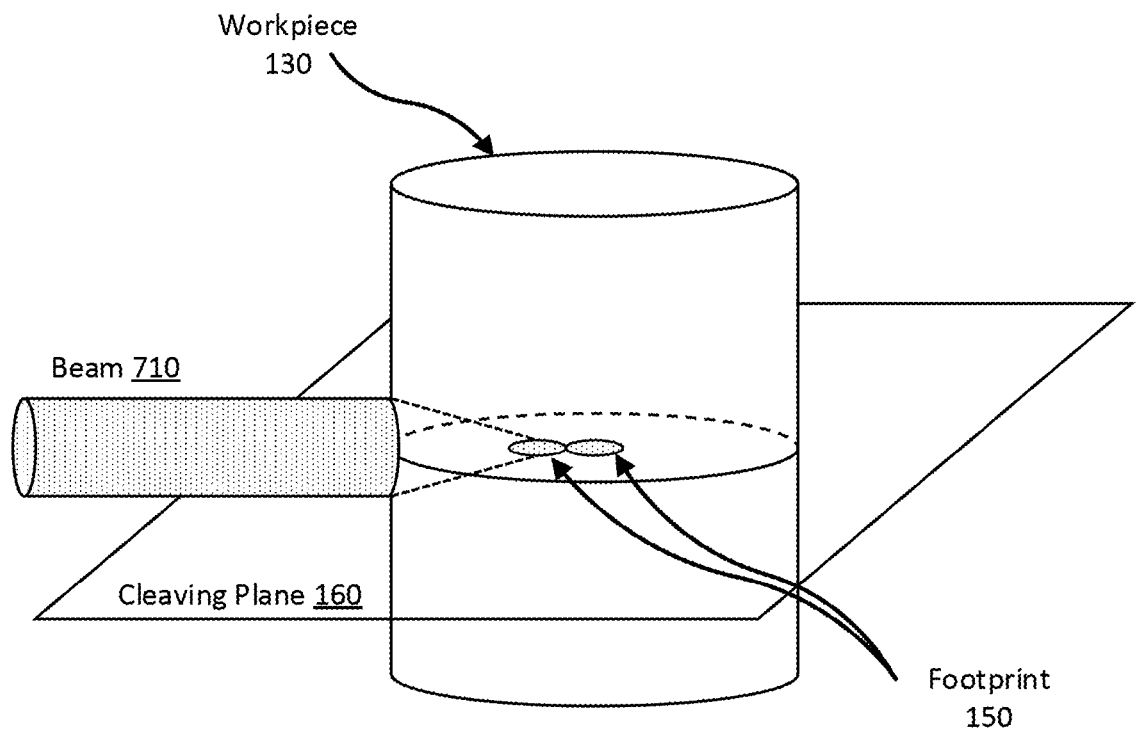
Figure 7D:
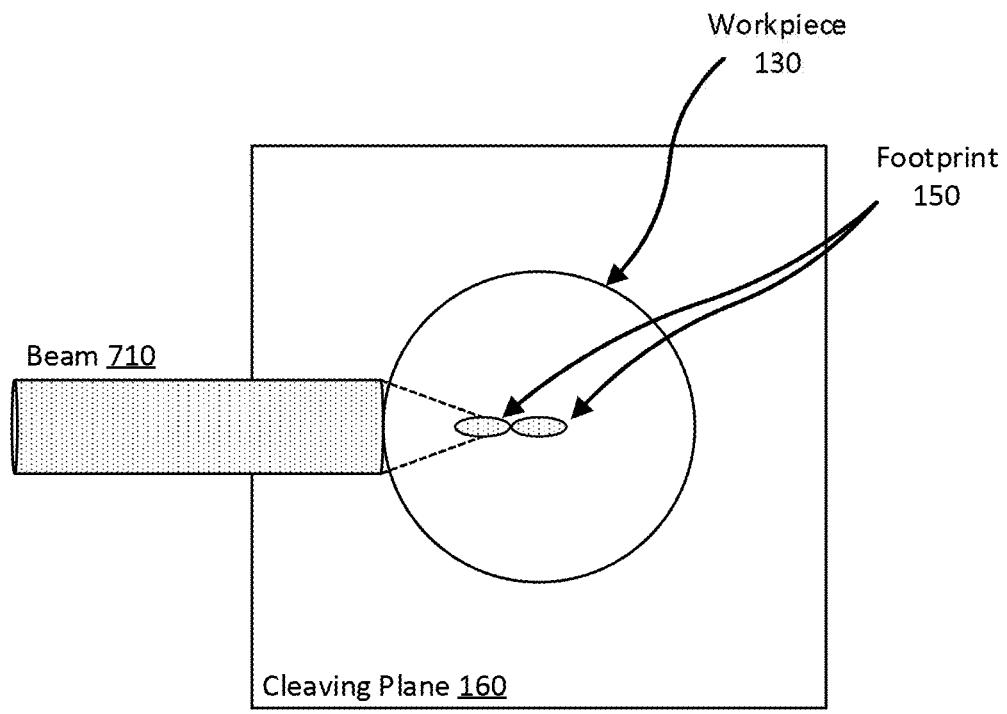

Returning to FIG. 6, the system controller 120 again configures 610 the internal preparation system 230. In this example, configuring the internal preparation system 230 repositions optics such that the footprint 150 inside the workpiece 130 is at a different location on the cleaving plane 160. After the internal preparation system 230 is again configured, the system controller 120 projects 620 a beam that is focused to create 630 a new footprint 150. This process is illustrated in FIGS. 7C and 7D.

Notably, FIGS. 7A-7D illustrate an example where the propagation direction of the laser beam used to internally prepare a workpiece 130 is perpendicular to the long axis of the workpiece 130, but other examples of laser beam orientation are also possible. For example, the laser beam propagation direction may be parallel to the long axis of the workpiece. In this case, the laser beam would enter the workpiece from the top surface of the workpiece rather than a side surface of the workpiece.

Figure 8A:
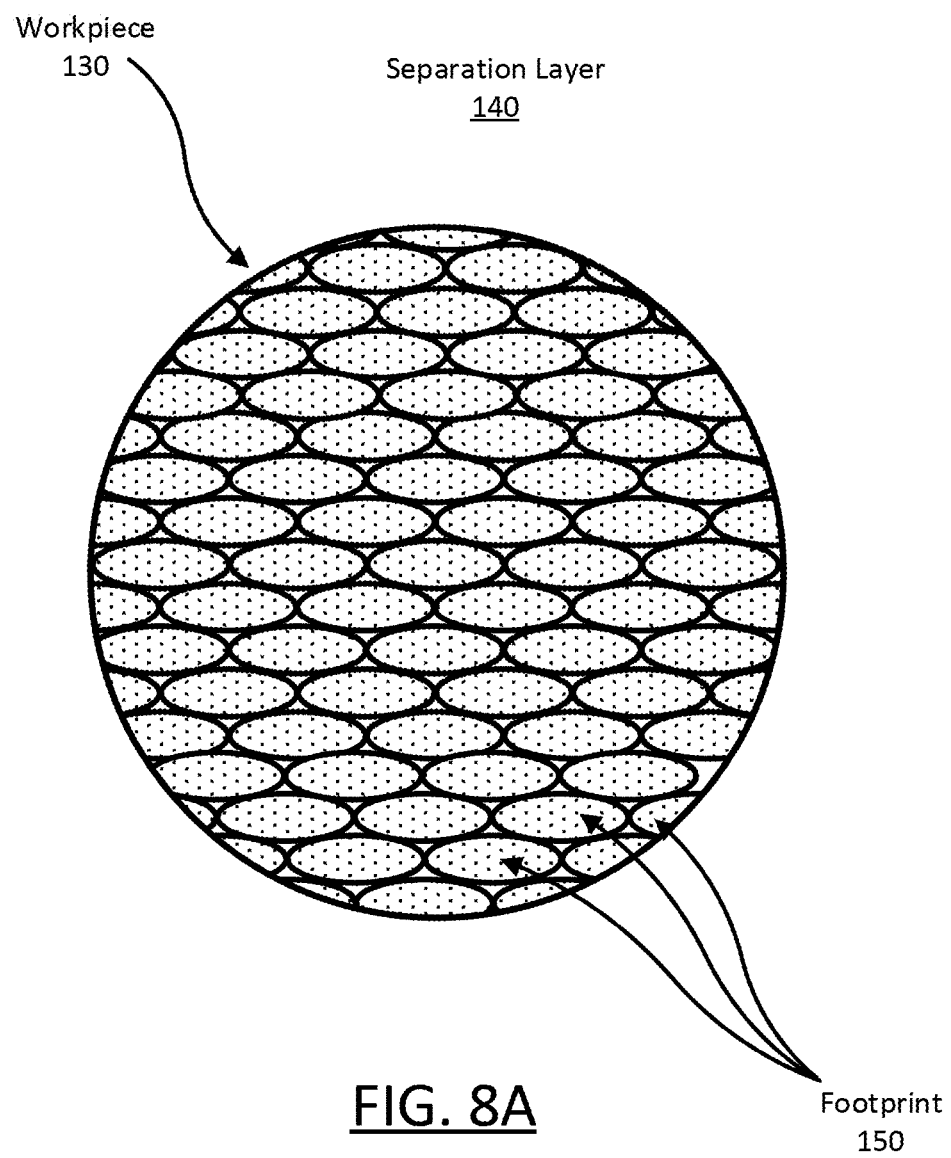
FIG. 8A illustrates footprints that create a separation layer within a workpiece, according to one example embodiment.
Figure 8B:
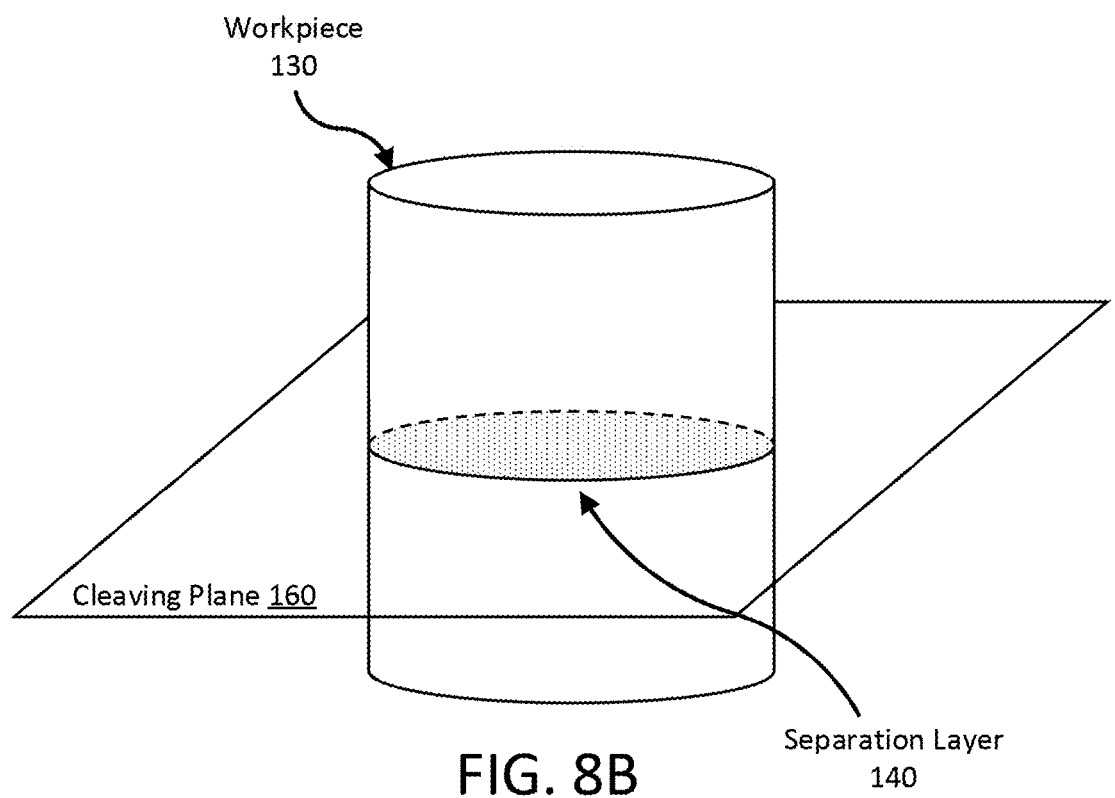
FIGS. 8B and 8C illustrate a separation layer internal to a workpiece, according to one example embodiment.
Figure 8C:
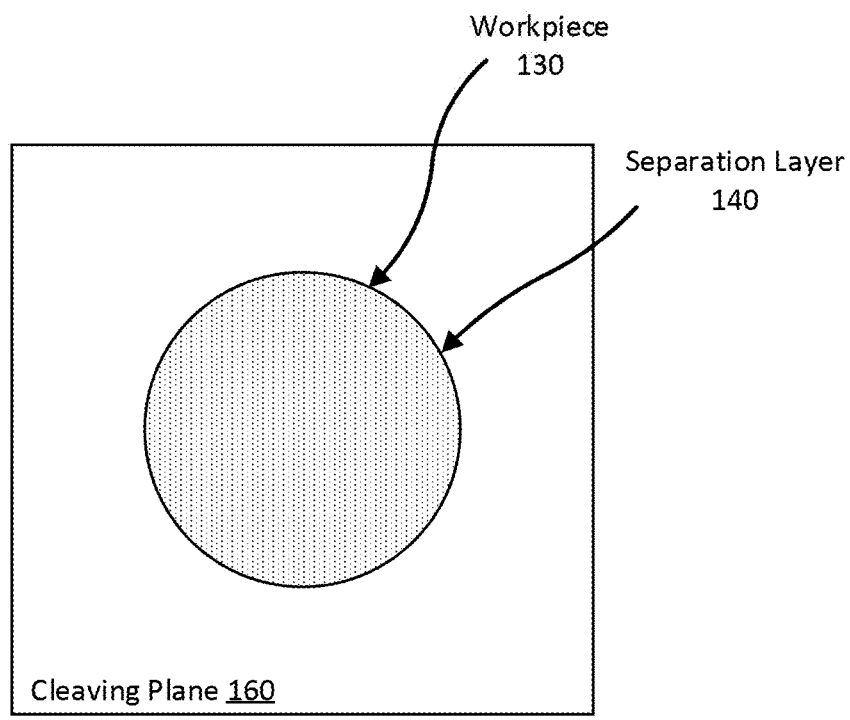

The process of creating footprints 150 continues iteratively until the footprints 150, in aggregate, create a separation layer 140. FIG. 8A shows an example of footprints 150 that form a separation layer 140 on a cleaving plane 160 of the workpiece 130. The cleaving plane 160 is the plane of the page. In other embodiments, the separation layer 140 can have various footprint 150 densities. That is, in some examples, the footprints 150 may have some overlap or may have additional spacing between footprints 150. Additionally, the system controller 120 may create the separation layer 140 using a particular footprint 150 pattern. For example, the system controller 120 may create footprints 150 using a raster pattern from one side to another, a pattern starting at the center and spiraling outwards, a pattern of forming concentric rings of footprints 150, etc. Whatever the pattern and density, the footprints 150 create a separation layer 140. FIGS. 8B and 8C show isometric and cross-sectional representations of the separation layer 140.

Figure 9:
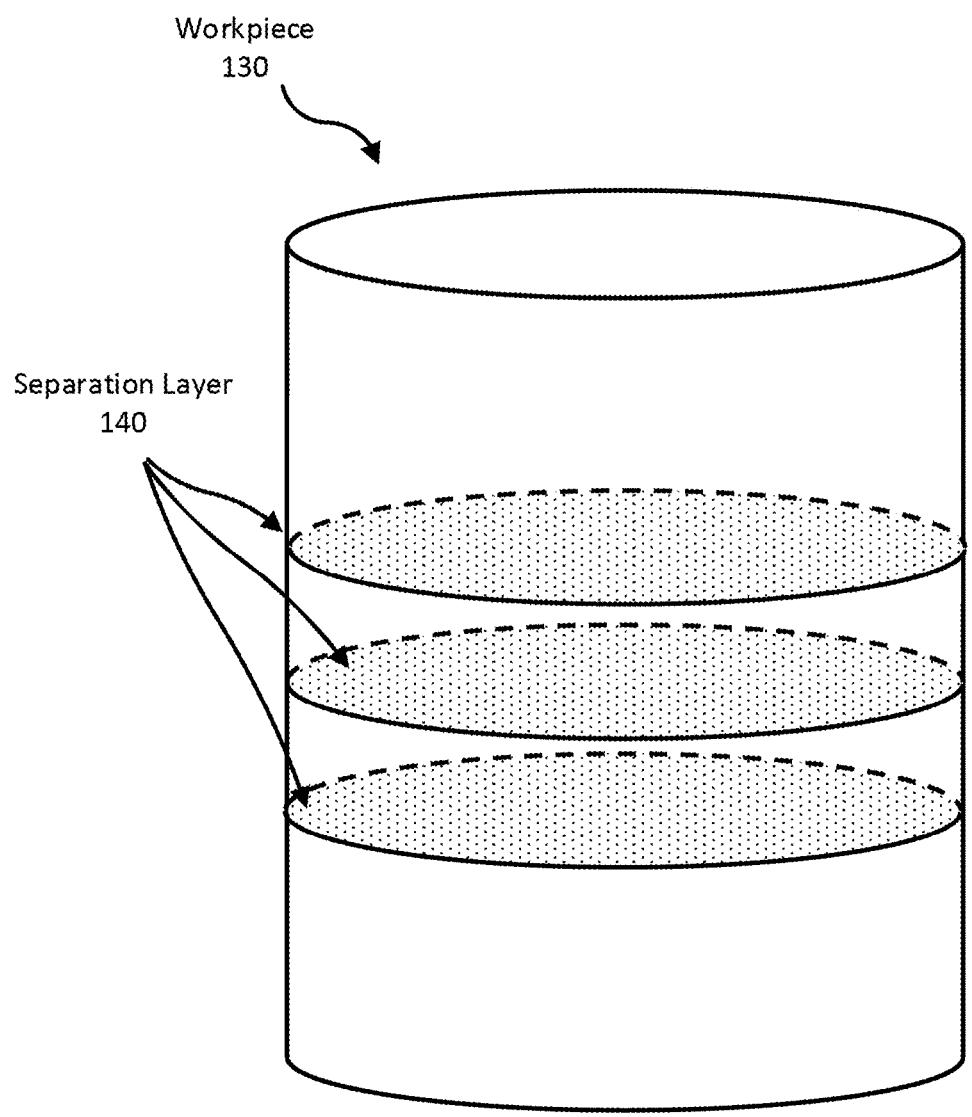
FIG. 9 illustrates a workpiece with multiple separation layers, according to one example embodiment.

Returning to FIG. 6, the system controller 120 determines the position of another separation layer 140. As such, the system controller 120 causes the positioner 220 to reposition the workpiece 130 and/or internal preparation system 230 to create another separation layer 140. Generally, the positioner 250 positions 640 the workpiece 130 by moving the workpiece 130 along its long axis to create another separation layer 140 that is parallel to the first separation layer 140. Once the workpiece 130 and internal preparation system 230 are appropriately positioned, the internal preparation system 230 creates another separation layer 140. An example of a workpiece 130 after the creation of multiple separation layers 140 is illustrated in FIG. 9. The distance between separation layers 140 designates the thickness of the cleaved piece produced after cleaving. The distance between separation layers may be limited by the thickness of a separation layer 140. For example, the separation layer may have a thickness t' and the distance between the centers of two adjacent separation layers in the workpiece is greater than, for example, t'. Generally, the thickness of the produced wafer is greater than 10 µm, but could be less than 10 µm. In another embodiment, multiple separation layers 140 are fabricated in parallel in a manner such that previous footprints 150 do not create interference in the creation of new footprints 150.

Figure 10A:
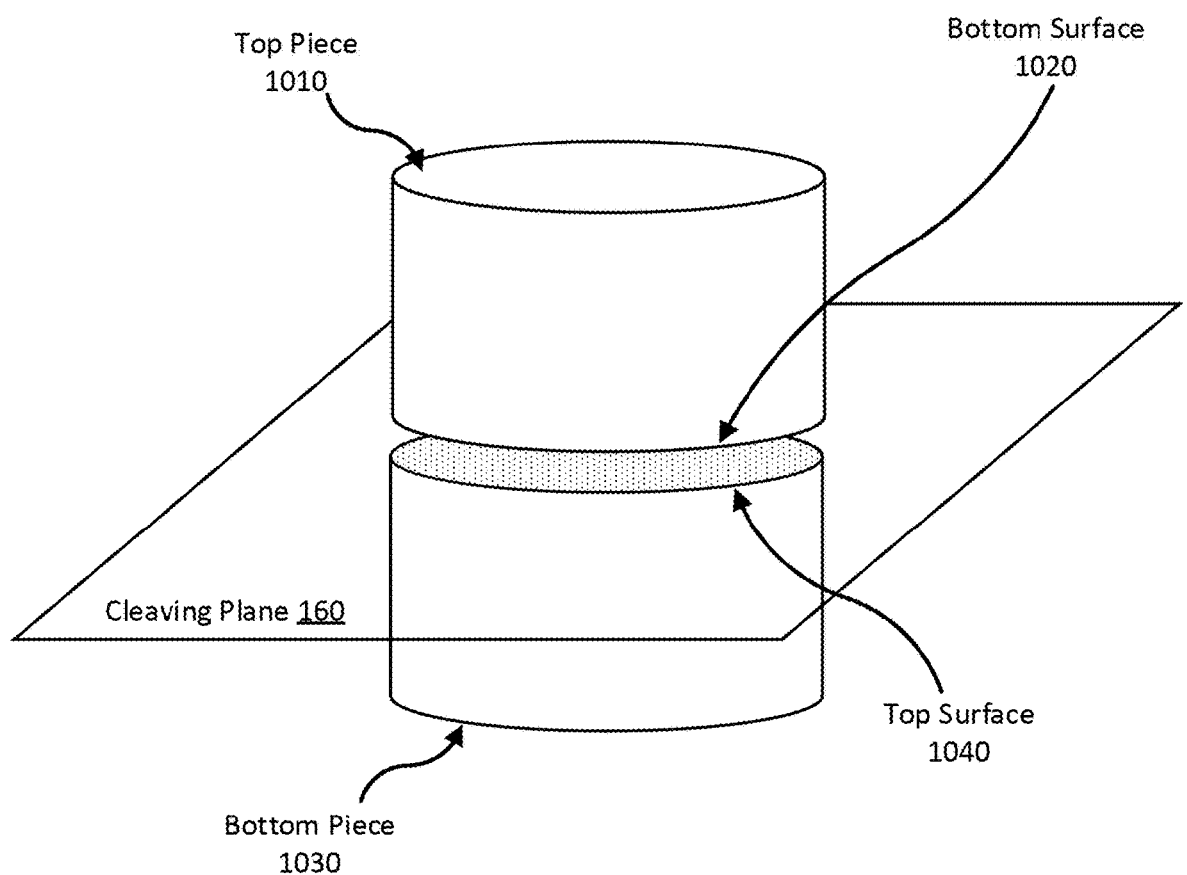
FIGS. 10A-10B illustrate examples of a workpiece cleaved along a separation layer 140 or layers.

FIG. 10A shows an example of a workpiece 130 that has been cleaved along a separation layer 140. The workpiece 130 cleaves into a top piece 1010 and a bottom piece 1030 along the separation layer 140 which, in this example, was coplanar with the cleaving plane 160. Here, bottom surface 1020 of the top piece 1010 was at the separation layer 140 and, similarly, the top surface 1040 of the bottom piece 1030 was at the separation layer 140.

Figure 10B:
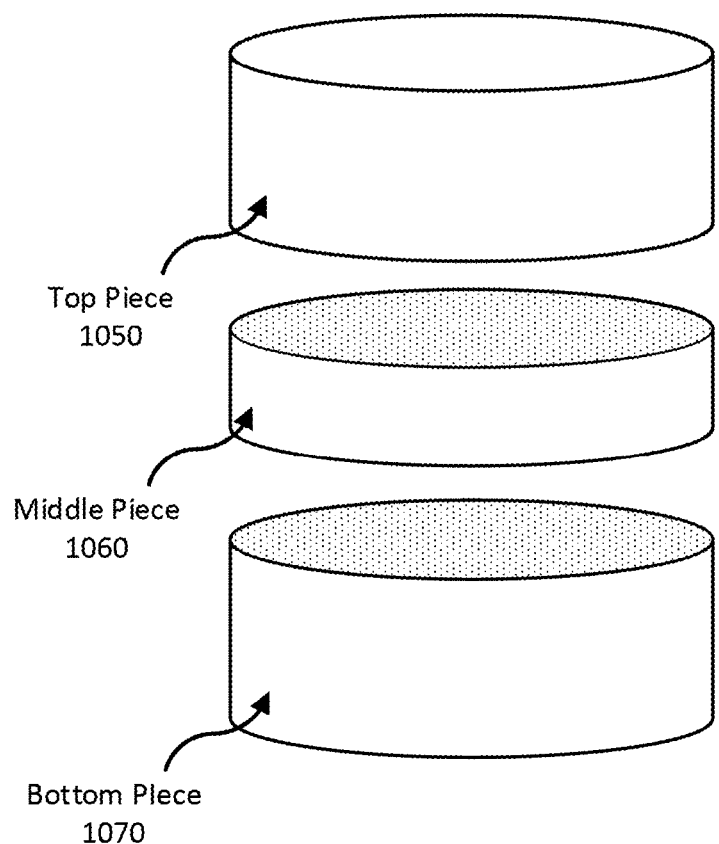

FIG. 10B shows an example of a workpiece 130 that has been cleaved along several separation layers 140. In this example, the workpiece cleaves into a top piece 1050, a middle piece 1060, and a bottom piece 1070. The surfaces that were previously joined were the locations of the cleaving planes 160 and coplanar separation layers 140. In various embodiments, the cleaving system 110 can cleave the workpiece 130 into any number of pieces. Each piece can have any desired thickness based on the proximity of separation layers 140 and cleaving planes 160.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for cleaving a workpiece of a material, comprising:
creating, using a laser generated by an internal preparation system, a separation layer within the workpiece having dissimilar material properties to the remaining material of the workpiece;
determining, using a controller, a position of a cleaving surface within the workpiece;
positioning, using a positioner, the workpiece such that the cleaving surface and the separation layer are coincident;
scoring, using an external preparation system, the workpiece to create a crack on an external surface of the workpiece at at least one point coincident with the separation layer; and
cleaving, using a cleaver, the workpiece to create a cleaved piece by generating a tensile force on the workpiece perpendicular to at least a portion of the separation layer that propagates the crack along the separation layer.

2. The method of claim 1, further comprising:
shaping, with a shaping system, the workpiece to a defined geometric shape such that the cleaved piece has a perimeter that is a cross-section of the defined geometric shape.

3. The method of claim 1, wherein creating the separation layer further comprises:
focusing the laser to a footprint internal to the workpiece, wherein a pulse of the laser locally changes the material properties of the workpiece at the footprint.

4. The method of claim 1, wherein creating the separation layer further comprises:
moving a focal point of the laser within the workpiece to create the separation layer, the separation layer formed as an aggregation of locally modified material at the focal point as it moves within the workpiece.

5. The method of claim 1, wherein cleaving the workpiece further comprises:
affixing the cleaver to opposing ends of the workpiece; and
generating the tensile force that propagates the crack along the separation layer, the tensile force generated between opposing ends of the workpiece and perpendicular to at least the portion of the separation layer.

6. The method of claim 5, wherein the cleaver is electrostatically affixed to opposing ends of the workpiece.

7. The method of claim 1, further comprising:
creating, using the laser, another separation layer within the workpiece having dissimilar material properties.

8. The method of claim 7, further comprising:
cleaving, using the cleaver, the workpiece along the other separation layer to create another cleaved piece.

9. The method of claim 1, wherein:
the laser is a pulsed laser and the internal preparation system generates laser pulses at a repetition rate of at least 100 kHz.

10. A method for cleaving a workpiece of a material, comprising:
creating, using a laser generated by an internal preparation system, a separation layer within the workpiece having dissimilar material properties to the remaining material of the workpiece;
scoring, using an external preparation system, the workpiece to create a crack on an external surface of the workpiece at at least one point coincident with the separation layer;
cleaving, using a cleaver, the workpiece to create a cleaved piece by generating a tensile force on the workpiece perpendicular to at least a portion of the separation layer that propagates the crack along the separation layer; and cropping the cleaved piece into a particular geometry using a cropper.

11. A system for cleaving a workpiece of a material, comprising:

an internal preparation system configured to generate a laser beam for creating a separation layer within the workpiece, the separation layer having dissimilar material properties to the remaining material of the workpiece;

a controller configured to determine a position of a cleaving surface within the workpiece;

a positioner configured to position the workpiece such that the cleaving surface is coincident with the separation layer;

an external preparation system configured to score the workpiece to create a crack on the surface of the workpiece at at least one point coincident with the separation layer; and a cleaver configured to create a cleaved piece of the workpiece by generating a tensile force on the workpiece perpendicular to at least a portion of the separation layer that propagates the crack along the separation layer.

12. The system of claim 11, further comprising:

a shaper configured to shape the workpiece to a defined geometric shape such that the cleaved piece has a perimeter that is a cross-section of the defined geometric shape.

13. The system of claim 11, wherein the internal preparation system further comprises:

a focusing system configured to focus the laser to a footprint internal to the workpiece, wherein a pulse of the laser locally changes the material properties of the workpiece at the footprint.

14. The system of claim 11, wherein the internal preparation system further comprises:

a focusing system configured to move a focal point of the laser within the workpiece to create the separation layer, the separation layer formed as an aggregation of locally modified material at the focal point as it moves within the workpiece.

15. The system of claim 11, wherein:

the cleaver further configured to affix to opposing ends of the workpiece and generate the tensile force that propagates the crack along the separation layer, the tensile force generated between opposing ends of the workpiece and perpendicular to at least the portion of the separation layer.

16. The system of claim 15, wherein the cleaver is configured to electrostatically affix to opposing ends of the workpiece.

17. The system of claim 11, wherein the internal preparation system is further configured to create, using the laser, another separation layer within the workpiece having dissimilar material properties.

18. The system of claim 17, wherein the cleaver is further configured to cleave the workpiece along the other separation layer to create another cleaved piece.

19. The system of claim 11, wherein the laser beam generated by the internal preparation system is a pulsed laser beam with pulses generated at a repetition rate of at least 100 kHz.

20. A system for cleaving a workpiece of a material, comprising:

an internal preparation system configured to generate a laser beam for creating a separation layer within the workpiece, the separation layer having dissimilar material properties to the remaining material of the workpiece;

an external preparation system configured to score the workpiece to create a crack on the surface of the workpiece at at least one point coincident with the separation layer;

a cleaver configured to create a cleaved piece of the workpiece by generating a tensile force on the workpiece perpendicular to at least a portion of the separation layer that propagates the crack along the separation layer; and a cropper configured to crop the cleaved piece into a particular geometry.

* * * * *